(12) United States Patent
Tamayama et al.

(10) Patent No.: US 7,068,732 B2
(45) Date of Patent: Jun. 27, 2006

(54) RECEIVING APPARATUS AND POWER CONTROL METHOD

(75) Inventors: Ken Tamayama, Tokyo (JP); Hiroshi Adachi, Chiba (JP)

(73) Assignee: Sony Corporation, Tokyo (JP)

( * ) Notice: Subject to any disclaimer, the term of this patent is extended or adjusted under 35 U.S.C. 154(b) by 737 days.

(21) Appl. No.: 09/870,036

(22) Filed: May 30, 2001

(65) Prior Publication Data

US 2002/0009160 A1    Jan. 24, 2002

(30) Foreign Application Priority Data

May 31, 2000    (JP)   ............................. 2000-161789

(51) Int. Cl.
    *H03K 9/00*      (2006.01)
    *H04L 27/06*     (2006.01)
    *H04L 27/14*     (2006.01)
    *H04L 27/22*     (2006.01)

(52) U.S. Cl. ...................... 375/316; 375/319; 375/352
(58) Field of Classification Search ................ 375/316; 348/14.01, 14.02, 14.13, 725
See application file for complete search history.

(56) References Cited

U.S. PATENT DOCUMENTS 6,067,121 A * 5/2000 Shigihara .................... 348/473

FOREIGN PATENT DOCUMENTS

| EP | 0 358 166 | 3/1990 |
| EP | 0 037 464 | 9/2000 |
| JP | 11-298351 | * 10/1999 |

OTHER PUBLICATIONS

Patent Abstracts of Japan vol. 2000, No. 1, Jan. 31, 2000 & JP 11 298351 A (Sharp Corp), Oct. 29, 1999.

* cited by examiner

*Primary Examiner*—Jay K. Patel
*Assistant Examiner*—Juan Alberto Torres
(74) *Attorney, Agent, or Firm*—Frommer Lawrence & Haug LLP; William S. Frommer; Thomas F. Presson

(57) ABSTRACT

A receiving apparatus and a power control method that permit standby power consumption to be reduced. If a Digital Signal Processor (DSP) stores an Entitlement Management Message (EMM), which is contained in a MPEG transport stream (MPEG TS) packet, in a memory, the DSP supplies a startup signal to a human interface (HI) microcomputer. According to the startup signal from the DSP, the HI microcomputer supplies power to a back-end portion to start up a main microcomputer, which causes the main microcomputer to initiate processing.

10 Claims, 5 Drawing Sheets

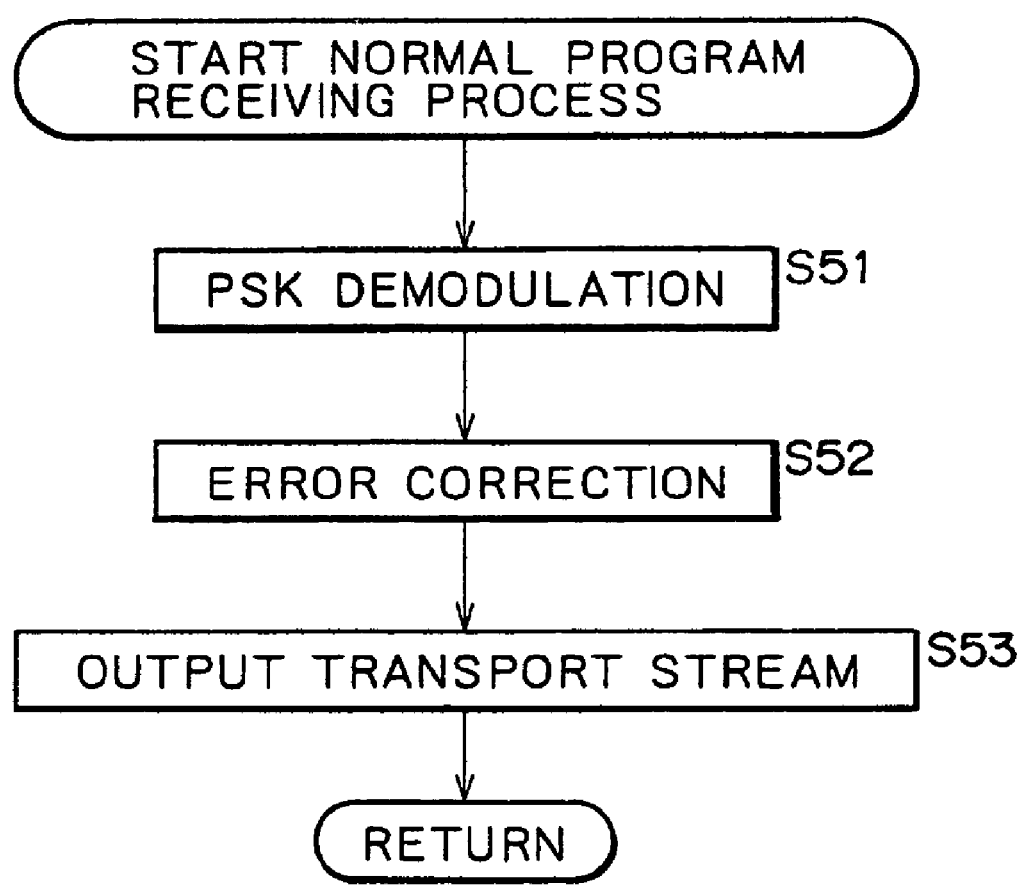

RECEIVING APPARATUS AND POWER CONTROL METHOD

BACKGROUND OF THE INVENTION

The present invention relates to a receiving apparatus and a power control method, in particular, to a receiving apparatus configured to reduce its standby power consumption to a minimum, and a power control method.

In recent years, digital satellite broadcasts are coming into wider use. The digital satellite broadcasts are capable of transmitting a high quality signal as compared with existing analogue broadcasts, and are designed to use a multi channel method. Concerning such digital satellite broadcasts, a plurality of specialized channels for sports, movies, music, news, etc., are prepared. A receiving apparatus of a user receives only channels selected from among the plurality of specialized channels, for which the user makes contract.

By the way, in order to receive channels for which a user makes contract (limited receiving), it is necessary to receive individual information of each user (EMM: Entitlement Management Message), which is sent from a sending side, and to store it in a receiving apparatus beforehand.

That is to say, concerning conventional receiving apparatuses, radio waves received by an antenna are amplified and frequency-converted in a high-frequency portion. Moreover, required processing including PSK demodulation and error correction is performed for the frequency-converted data in a DSP (Digital Signal Processor). The high-frequency portion and the DSP are generally housed in one shielded case, which is called a front-end portion. Then, a transport stream, which is output from the front-end portion, is separated into audio data, video data, program specification information, and the like by a demultiplexer, and is judged whether or not a desired EMM has been received. If a result of the judgment is that the desired EMM has been received, that EMM is stored.

Accordingly, the receiving apparatus should always be in a power-on state (energized state) for the purpose of receiving an EMM, which is transmitted unexpectedly; and in order to judge whether or not the EMM is desired one, circuits such as a demultiplexer circuit are required to be operated. Therefore, there is a problem of high power consumption even in a standby state (standby power consumption).

For these reasons, in Japanese Patent Laid-Open No. Hei 11-317713, the following technology is disclosed: on a transmission side, EMM transmission-schedule information, in which scheduled time of EMM transmission is described, is transmitted; and on a receiving side, after the received EMM transmission-schedule information is analyzed, transmission time of EMM, whose destination is that on the receiving side, is stored. This permits power supplies for portions other than CPU (Central Processing Unit) to be turned off while a program is not viewed, which minimizes standby power consumption.

However, in the case of this technology, there is a cost problem because existing transmission apparatuses additionally require a function of generating EMM transmission-schedule information.

SUMMARY OF THE INVENTION

It is an object of the present invention to provide a receiving apparatus and a power control method which permit standby power consumption to be easily reduced at low cost.

A receiving apparatus according to the present invention comprises: receiving means for receiving a transport stream; extracting means for extracting a given transport-stream packet from the transport stream received by the receiving means; storing means for storing individual information contained in the transport stream on the basis of a result of extraction by the extracting means; transmitting means for transmitting a control signal so as to supply power to a given circuit when the individual information is stored in the storing means; and control means for controlling power supply to the given circuit according to the control signal transmitted by the transmitting means.

A receiving apparatus according to the present invention can have additionally determining means for determining a kind of the control signal transmitted by the transmitting means.

The given circuit can perform processing corresponding to the individual information stored in the storing means.

The extracting means can extract the transport stream packet whose destination is that on the receiving side from the transport stream.

The extracting means can extract the transport stream packet whose destination is that on the receiving side from a packet ID (PID).

Moreover, the individual information contained in the transport stream can be accumulated into the storing means one after another on the basis of a result of extraction by the extracting means, and the transmitting means can transmit the control signal to the given circuit when a capacity of the storing means exceeds a given value.

A power control method according to the present invention comprises: a receiving step of receiving a transport stream; an extracting step of extracting a given transport-stream packet from the transport stream received by processing in the receiving step; a storing control step of controlling storing of individual information contained in the transport stream on the basis of a result of extraction in the extracting step; a transmitting step of transmitting a control signal so as to supply power to a given circuit when the storing of the individual information is controlled by processing in the storing control step; and a control step of controlling power supply to the given circuit according to the control signal transmitted by processing in the transmitting step.

In the receiving apparatus and the power control method, according to the present invention, a transport stream is received, and then a given transport-stream packet is extracted from the received transport stream. When individual information contained in the extracted transport stream is stored, power supply to a given circuit is controlled, which permits standby power consumption to be easily reduced at low cost.

BRIEF DESCRIPTION OF THE DRAWINGS

FIG. 5 is a flowchart illustrating a normal program receiving process in a step S33 shown in FIG. 4.

DETAILED DESCRIPTION OF THE PREFERRED EMBODIMENTS

Figure 1:
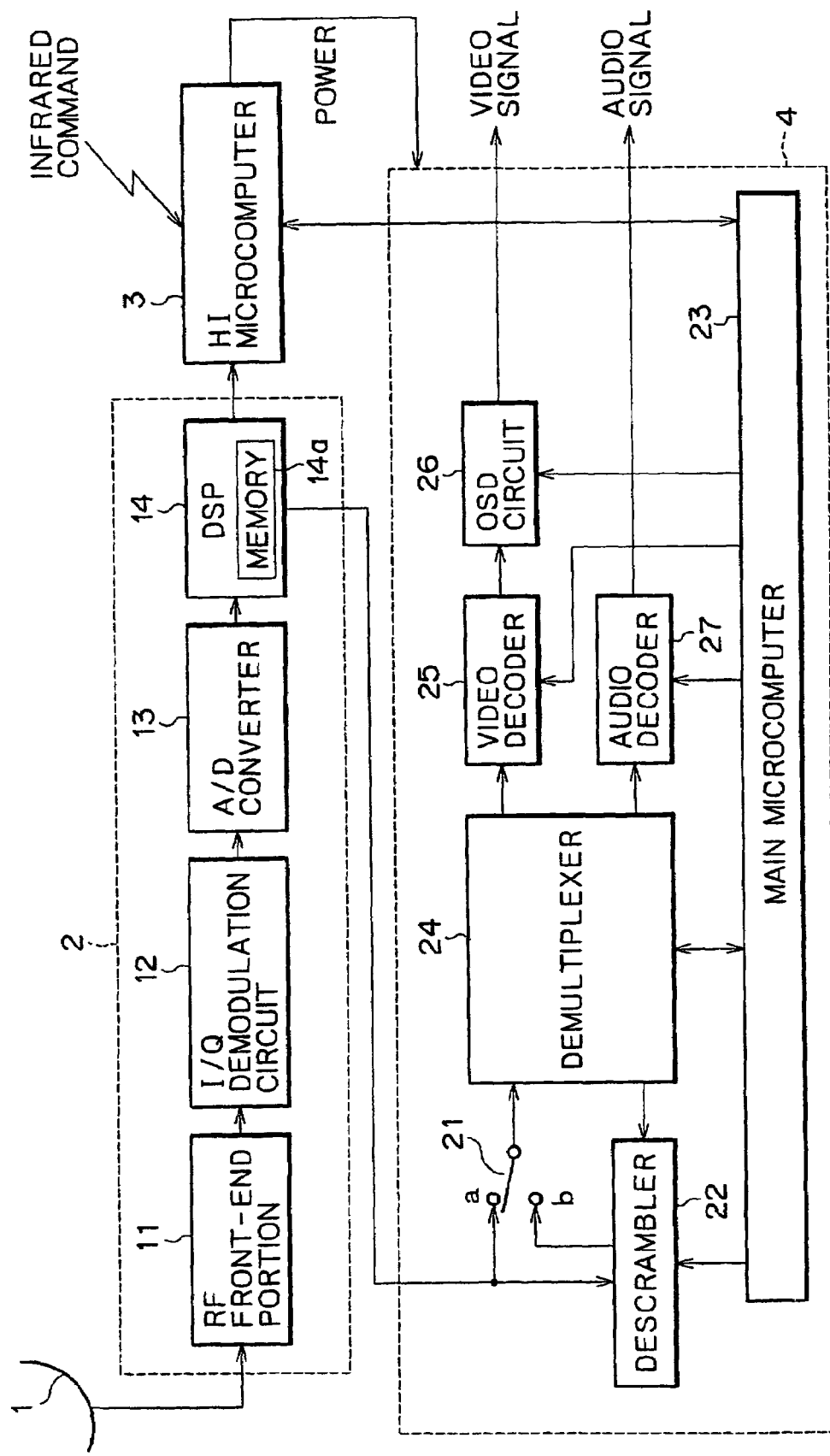
FIG. 1 is a block diagram illustrating a configuration of an embodiment of a receiving apparatus, to which the present invention is applied.

FIG. 1 is a block diagram illustrating a configuration of an embodiment of a receiving apparatus according to the present invention. The receiving apparatus comprises a front-end portion 2, a human interface (HI) microcomputer 3, and a back-end portion 4.

An antenna 1 receives CS (Communications Satellite) waves transmitted from a transmission apparatus, which is not shown in the diagram, through a communications satellite. A RF (Radio Frequency) front-end portion 11 performs the following: amplifying an IF (Intermediate Frequency) signal of a broadcasting signal (for example, a video signal and an audio signal, which have been compressed and encoded by means of MPEG2 (Moving Picture Experts Group 2) method) received by the antenna 1; frequency-converting the IF signal furthermore; and supplying the converted signal to an I/Q demodulation circuit 12. The I/Q demodulation circuit 12 orthogonally detects an inputted broadcasting signal, and supplies an I signal and a Q signal, which have been detected, to an A/D (Analog to Digital) converter 13. The A/D (Analog to Digital) converter 13 converts the inputted analog I and Q signals into digital signals, and supplies the digital signals to a digital signal processor (DSP) 14.

The DSP 14 comprising a memory 14a performs given processing, such as PSK (Phase-Shift Keying) demodulation processing, error-correction processing, filter processing, and the like, for the inputted digital data in a state of standby for EMM receiving. The DSP 14 judges whether or not there is a MPEG transport-stream packet (hereinafter referred to as 'MPEG TS packet'), whose destination is that on the receiving side, in a MPEG transport stream (hereinafter referred to as 'MPEG TS'). If the DSP judges that there is a MPEG TS packet whose destination is that on the receiving side, the DSP 14 extracts this MPEG TS packet.

In addition, the DSP 14 judges whether or not an EMM is contained in the extracted MPEG TS packet. As a result of the judgment, if it is found out that an EMM is contained, the DSP 14 stores the EMM in the memory 14a before supplying a control signal (startup signal) to the HI microcomputer 3. The DSP 14 also performs processing, such as PSK demodulation processing, and error-correction processing, for the inputted digital data in a normal receiving state, and then outputs a MPEG TS. If the MPEG TS is not scrambled, the MPEG TS is directly output to a demultiplexer 24 via a terminal a of a switch 21. If the MPEG TS is scrambled, the MPEG TS is output to a descrambler 22 temporarily.

Those components from the RF front-end portion 11 to the DSP 14 are housed in one shielded case, which constitutes a front-end portion 2.

The HI microcomputer 3 turns on a power switch (main power supply) on a body of the back-end portion 4 according to the following signal: a control signal (startup signal) from the DSP 14; an infrared command that is transmitted by user's operating an infrared remote command unit (hereinafter referred to as 'infrared remote control unit'), which is not shown in the drawing; or a startup signal that is issued by user's operating a front panel switch. In addition, the HI microcomputer 3 notifies a main microcomputer 23 whether or not a signal is a control signal from the front-end portion 2 or one of the other control signals (an instruction from a user).

According to control of the main microcomputer 23, the switch 21 is switched in the following manner: when an unscrambled MPEG TS packet (a packet including EMM, ECM (Entitlement Control Message), program specification information, and program table data) is supplied to the demultiplexer 24, the switch 21 is switched so as to select the terminal a; and when the descrambler 22 supplies a descrambled MPEG TS packet (a video packet and an audio packet) to the demultiplexer 24, the switch 21 is switched so as to select a terminal b.

The demultiplexer 24 performs demultiplexing processing of a MPEG TS supplied from the DSP 14 or the descrambler 22 through the switch 21. After that, the demultiplexer 24 supplies video data to a video decoder 25, supplies audio data to an audio decoder 27, and supplies an EMM, an ECM, program specification information data, program table data, and the like to the main microcomputer 23.

The main microcomputer 23 decodes the EMM using its own individual key stored in a built-in memory to extract a work key and contract information, and also decodes the ECM using the work key to extract contract information and a scramble key. The descrambler 22 descrambles video data and audio data of the MPEG TS supplied from the DSP 14 using the scramble key, and outputs the video data and the audio data to the demultiplexer 24 via the terminal b of the switch 21.

In addition, according to control of the HI microcomputer 3, the main microcomputer 23 controls the following: the switch 21 of the back-end portion 4; the descrambler 22; the demultiplexer 24; the video decoder 25; an on-screen display circuit (OSD) circuit 26; and the audio decoder 27.

According to control of the main microcomputer 23, the video decoder 25 decodes video data supplied from the demultiplexer 24, and outputs the video data to the on-screen display circuit 26. The on-screen display circuit 26 converts information such as program table data into corresponding image data according to control of the main microcomputer 23, and then superposes the image data on image data supplied from the video decoder 25. After that, the on-screen display circuit 26 outputs a video signal, which has been obtained, to a monitor (not shown in the diagram). According to control of the main microcomputer 23, the audio decoder 27 decodes audio data supplied from the demultiplexer 24, and outputs the obtained audio signal to a speaker (not shown in the drawing).

The components from the switch 21 to the audio decoder 27 are housed in one shielded case, which constitutes a back-end portion 4. A power supply of the back-end portion 4 is controlled by the HI microcomputer 3. When a user instructs power-on, or when a given EMM is extracted in the DSP 14 in a standby state, the power switch is turned on. In other cases, the power switch is turned off.

Next, a standby receiving process of the receiving apparatus shown in FIG. 1 is described with reference to a flowchart shown in FIG. 2.

In a step S1, the DSP 14 of the front-end portion 2 (that is always in an energized state) monitors data supplied from the A/D converter 13, and judges whether or not the antenna 1 has received the data. In other words, the RF front-end portion 11 performs frequency conversion of an IF signal, which has been inputted from the antenna 1, and outputs the converted signal to the I/Q demodulation circuit 12. The I/Q demodulation circuit 12 demodulates I and Q signals from the inputted signal, and outputs the signals to the DSP 14 via the A/D converter 13. The DSP 14 performs this judgment processing from output of the A/D converter 13.

In the step S1, if a result of the judgment is that the data has not yet been received, the DSP 14 waits until judgment that the data has been received is obtained. When the data is received, process proceeds to a step S2, where the DSP 14 performs PSK demodulation for the inputted digital data. In a step S3, the DSP 14 performs error-correction processing for the digital data, which has been demodulated by the PSK demodulation processing of the step S2.

In a step S4, the DSP 14 extracts a MPEG TS packet whose destination is that on the receiving side by performing filter processing for the digital data, for which PSK demodulation and error-correction have been performed in the steps S2 and S3.

Figure 3:
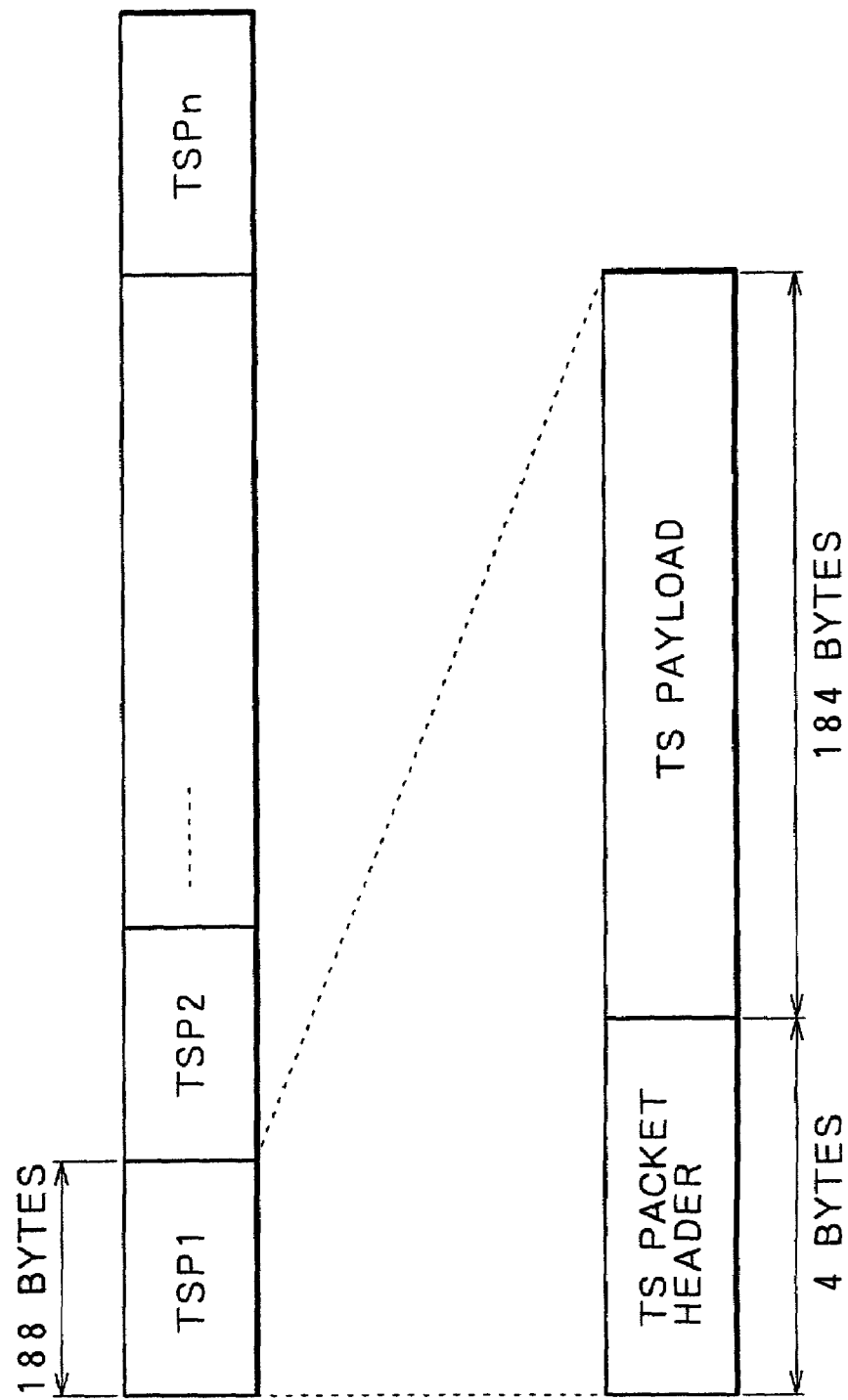
FIG. 3 is a diagram illustrating a MPEG TS.

Here, the filter processing is described with reference to FIG. 3. A MPEG TS is made up of a plurality of TS packet (from TSP1 to TSPn). As shown in FIG. 3, four bytes from a top of a TS packet, which consists of 188 bytes, constitute a TS packet header; and remaining 184 bytes constitutes a TS payload.

In the TS packet header, the following are allocated: a 13-bits packet ID (PID); and information about presence or absence of 2-bit TS payload scramble (TS scramble control); and the like. In the TS payload, the following are allocated: video data; audio data; a program table; ECM as common information including a program number; EMM; or the like. The DSP 14 analyzes the PID, which is allocated in a TS packet header of each TS packet, and then extracts only TS packets, in which data (TS payload) transmitted to this receiving side is allocated (PID filter processing). Moreover, the DSP 14 links the extracted TS packets whose destination is that on the receiving side to form a section, and then extracts only sections that include EMM (section filter processing).

Returning to FIG. 2, in a step S5, the DSP 14 judges whether or not desired data (EMM) has been extracted by the processing of the step S4. If the DSP 14 judges that the desired data has not yet been extracted, the process returns to the step S1 and continues the above-mentioned processing. After that, in the step S5, if the DSP 14 judges that the desired data has been extracted, the process proceeds to a step S6. In the step S6, the DSP 14 stores the EMM, which has been extracted in the processing of the step S4, in the built-in memory 14a.

In a step S7, the DSP 14 transmits a startup signal to the HI microcomputer 3. According to the startup signal transmitted by the processing of the step S7, the HI microcomputer 3 supplies power to the back-end portion 4 (in a standby state, power is not supplied) to start up the main microcomputer 23. In a step S8, the main microcomputer 23 starts processing.

Here, the processing of the main microcomputer 23 is described with reference to a flowchart shown in FIG. 4.

In a step S21, the main microcomputer 23 judges whether or not a startup signal has been received. If a result of the judgment is that the startup signal has not yet been received, the main microcomputer 23 waits until the startup signal is received. When the startup signal is received, a process proceeds to a step S22, where the main microcomputer 23 communicates with the HI microcomputer (that is always energized) to inquire a source of the startup signal.

In a step S23, according to a communication result in the processing of the step S22, the main microcomputer 23 judges whether or not startup is from the front-end portion 2. If the main microcomputer 23 judges that the startup is from the front-end portion 2, then the process proceeds to a step S24. In the step S24, the main microcomputer 23 controls the HI microcomputer 3 so that the HI microcomputer 3 reads data accumulated in the memory 14a of the DSP 14 in the front-end portion 2.

In a step S25, the main microcomputer 23 controls the DSP 14 through the HI microcomputer 3 so that the data (EMM) stored in the memory 14a is read. In a step S26, the main microcomputer 23 decodes the EMM, which has been read in the step S25, using an individual key, and extracts a work key and contract information to store them in an internal memory. This permits broadcasting data of a contract program to be received.

In the step S23, as a result of the judgment, if it is found out that the startup is not from the front-end portion 2, the process proceeds to a step S27, where the main microcomputer 23 additionally judges whether or not the startup is from the infrared remote control unit or the front panel switch. That is to say, the main microcomputer 23 judges whether or not power-on is instructed by a user. If the main microcomputer judges that the startup is from the infrared remote control unit or the front panel switch, the process proceeds to a step S28.

In the step S28, the main microcomputer 23 inquires of the HI microcomputer 3 whether or not data is accumulated in the memory 14a. In a step S29, the main microcomputer 23 judges whether or not the data is accumulated in the memory 14a of the DSP 14; to be more specific, the main microcomputer 23 judges whether or not a response indicating that the data is accumulated is received from the HI microcomputer 3, in response to the inquiry in the step S28. In the step S29, if the main microcomputer 23 judges that the data is accumulated, the process proceeds to a step S30, where the maim microcomputer 23 controls the HI microcomputer 3 so as to output the data accumulated in the memory 14a.

In a step S31, the main microcomputer 23 controls the HI microcomputer 3 so that the data (EMM) stored in the memory 14a is read through the DSP 14. In a step S32, the main microcomputer 23 decodes the EMM, which has been read in the step S31, using an individual key, and extracts a work key and contract information to store them in an internal memory.

In the step S27, if a result of the judgment is that the startup is not from the infrared remote control unit or the front panel switch, that is to say, if power of the back-end portion 4 is directly applied by plugging a power cord in a wall outlet for example, or if a result of the judgment in the step S29 is that the data is not accumulated, the process proceeds to a step S33.

After the processing in the step S27, S29, or S32, the main microcomputer 23 controls the DSP 14 through the HI microcomputer 3, in the step S33, so as to perform a normal program receiving process.

Here, the normal program receiving process is described with reference to a flowchart shown in FIG. 5.

In a step S51, the DSP 14 performs PSK demodulation processing for inputted digital data. In a step S52, the DSP 14 performs error-correction processing for the digital data, which has been demodulated by the PSK demodulation processing of the step S51.

In a step S53, the DSP 14 outputs MPEG TS, for which the PSK demodulation processing and the error-correction processing have been performed in the steps S51 and S52, to the back-end portion 4.

If the MPEG TS is not scrambled, the MPEG TS is supplied to the demultiplexer 24 via the terminal a of the switch 21. On the other hand, if the MPEG TS is scrambled, the MPEG TS is supplied to the descrambler 22 via the terminal b of the switch 21. Then, the MPEG TS is decoded using a scramble key, and is supplied to the demultiplexer 24.

By the way, as shown in FIG. 3, analyzing TS scramble control information, which is allocated in a TS packet header of the MPEG TS, enables judgement whether or not the MPEG TS packet is scrambled. In addition, the main microcomputer 23 obtains the scramble key by decoding an ECM using a work key, which is obtained by decoding an EMM using an individual key.

The demultiplexer 24 performs demultiplexing processing of the supplied MPEG TS. After that, the demultiplexer 24 supplies video data to the video decoder 25, supplies audio data to the audio decoder 27, and supplies an EMM, an ECM, program specification information data, program table data, and the like to the main microcomputer 23. The video decoder 25 decodes the video data supplied from the demultiplexer 24, and outputs the video data to the on-screen display circuit 26. The on-screen display circuit 26 converts the program table data into corresponding image data, and then superposes the image data on image data supplied from the video decoder 25. After that, the on-screen display circuit 26 outputs a video signal, which has been obtained. The audio decoder 27 decodes the audio data supplied from the demultiplexer 24, and outputs the obtained audio data. After that, the process returns to a step S34 in FIG. 4.

Figure 4:
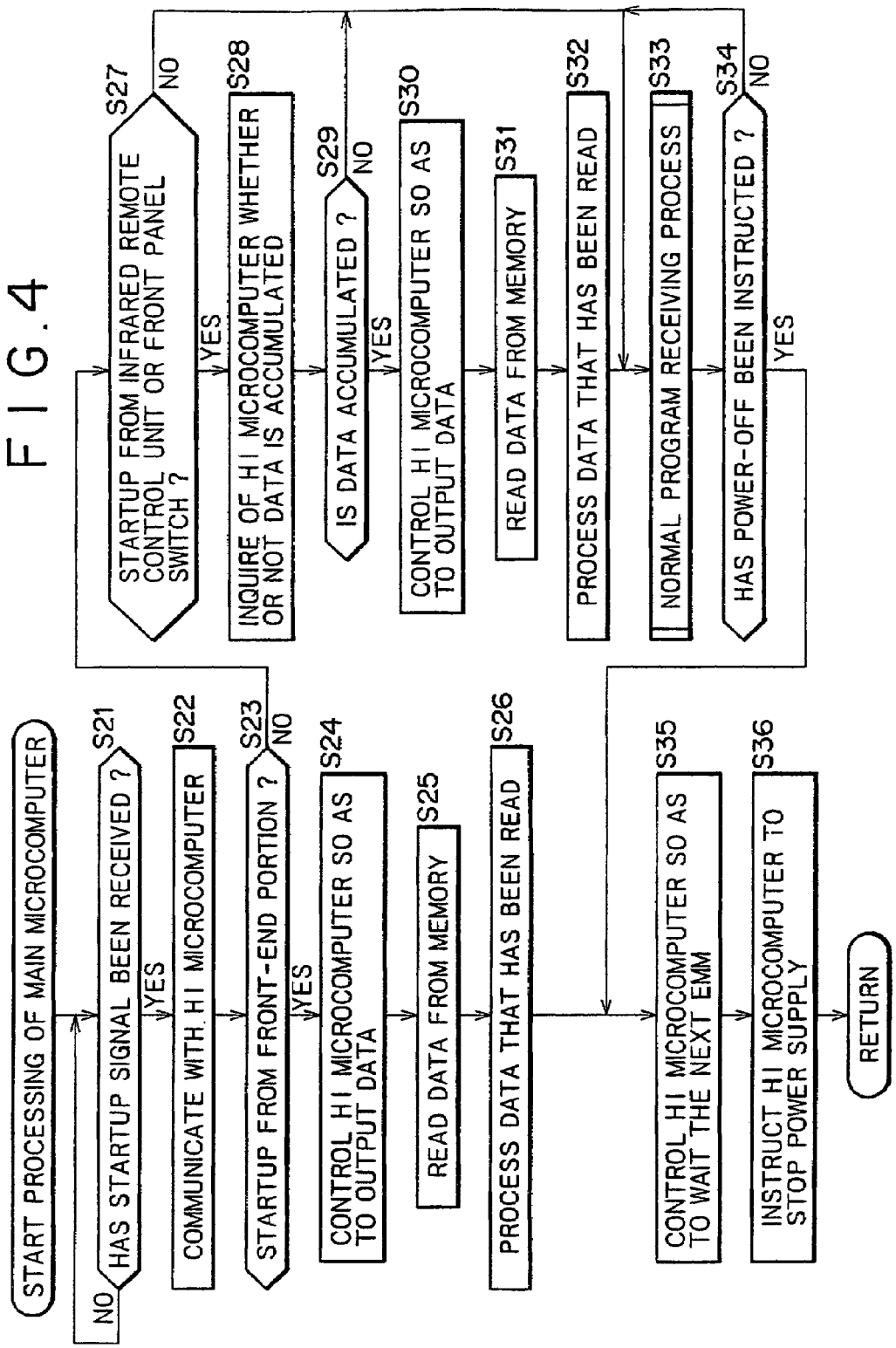
FIG. 4 is a flowchart illustrating startup processing of a main microcomputer in a step S8 shown in FIG. 2.

In the step S34 shown in FIG. 4, according to an instruction from the HI microcomputer 3, the main microcomputer 23 judges whether or not power-off of the back-end portion 4 is instructed; to be more specific, the main microcomputer 23 judges whether or not a power-off command for the receiving apparatus has been transmitted from the HI microcomputer 3 by user's operating the infrared remote control unit or the front panel switch. If the main microcomputer 23 judges that the power-off has not yet been instructed, the process returns to the step S33. The normal receiving process is repeated. After that, in the step S34, if the main microcomputer 23 judges that the power-off has been instructed, the process proceeds to a step S35.

After the processing of the step S26 or S34, the main microcomputer 23 controls the HI microcomputer 3, in the step S35, so as to wait the next EMM. In a step S36, the main microcomputer 23 instructs the HI microcomputer 3 to power off the back-end portion 4. After that, the process returns to a step S9 shown in FIG. 2.

Figure 2:
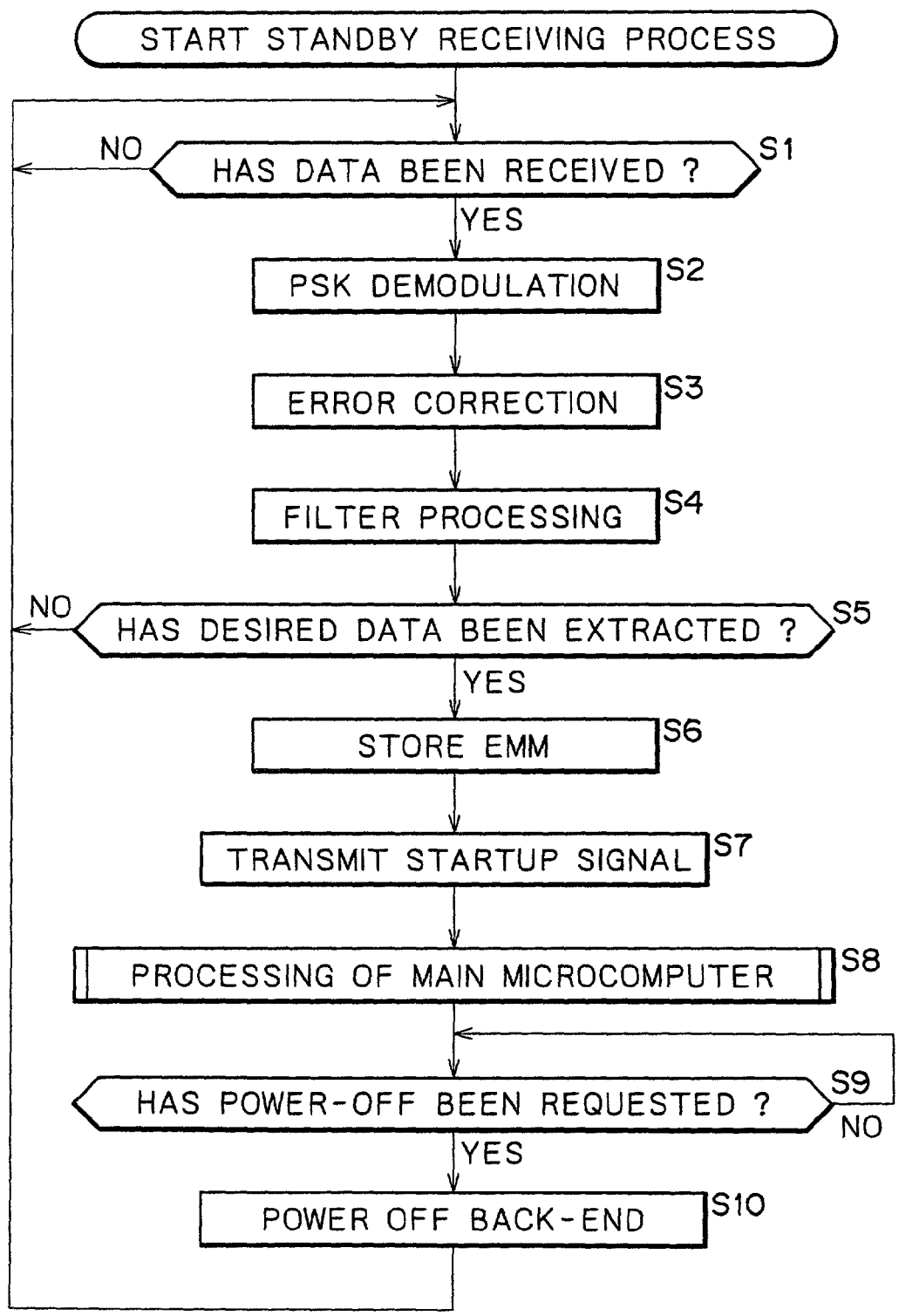
FIG. 2 is a flowchart illustrating a standby receiving process.

In the step S9 shown in FIG. 2, the HI microcomputer 3 judges whether or not a power-off request (command) for the back-end portion 4 has been received from the main microcomputer 23. If a result of the judgment is that the power-off request has not yet been received, the HI microcomputer 3 waits in the step S9 until the HI microcomputer 3 judges that the power-off request has been received. When the request to power off the back-end portion 4 is received, the process proceeds to a step S10, where the HI microcomputer 3 stops power that is supplied to the back-end portion 4. The process returns the step S1. After that, the process as described above is repeated.

As described above, in a standby state (a state in which main power supply is off), only the front-end portion 2 and the HI microcomputer 3 are energized. When the DSP extracts an EMM whose destination is that on the receiving side, the HI microcomputer 3 powers on the back-end portion 4. This permits standby power consumption to be reduced to a minimum. By the way, concerning how to stop power supplied to the back-end portion 4, supply of power itself may be stopped actually; or supply of power may be substantially stopped by stopping supply of clock.

Moreover, in the embodiment described above, every time an EMM whose destination is that on the receiving side is extracted, a startup signal is transmitted to the back-end portion 4. The present invention, however, is not limited to this. For example, the following method may also be used: accumulating EMMs in the memory 14a one after another; and when its capacity exceeds a given value, transmitting a startup signal to the back-end portion 4.

What is claimed is:

1. A receiving apparatus for receiving a transport stream transmitted from another apparatus, comprising:
   receiving means for receiving said transport stream;
   extracting means for extracting a given transport-stream packet from said transport stream received by said receiving means;
   storing means for storing individual information contained in said transport stream on the basis of a result of extraction by said extracting means;
   transmitting means for transmitting a control signal so as to supply power to a given circuit when said individual information is stored in said storing means; and
   control means for controlling supply of power to said given circuit according to said control signal transmitted by said transmitting means,
   wherein:
   said individual information contained in said transport stream is sequentially accumulated into said storing means on the basis of a result of extraction by said extracting means; and
   said transmitting means transmits said control signal to said given circuit when a capacity of said storing means exceeds a given value.

2. The receiving apparatus according to claim 1, further comprising:
   determining means for determining a kind of said control signal transmitted by said transmitting means.

3. The receiving apparatus according to claim 1, wherein:
   said given circuit performs processing corresponding to said individual information stored in said storing means.

4. The receiving apparatus according to claim 1, wherein:
   said extracting means extracts said transport stream packet whose destination is that on the receiving side from said transport stream.

5. The receiving apparatus according to claim 4, wherein:
   said extracting means extracts said transport stream packet whose destination is that on the receiving side from a packet ID (PID).

6. A power control method for a receiving apparatus for receiving a transport stream transmitted from another apparatus, said power control method comprising:
   a receiving step of receiving said transport stream;
   an extracting step of extracting a given transport-stream packet from said transport stream received by processing in said receiving step;
   a storing control step of controlling storing of individual information contained in said transport stream on the basis of a result of extraction in said extracting step;
   a transmitting step of transmitting a control signal so as to supply power to a given circuit when the storing of said individual information is controlled by processing in said storing control step; and
   a control step of controlling supply of power to said given circuit according to said control signal transmitted by processing in said transmitting step,
   wherein:
   said individual information contained in said transport stream is sequentially accumulated on the basis of a result of extraction in said extracting step; and in said transmitting step, said control signal is transmitted to said given circuit when a storing capacity in said storing control step exceeds a given value.

7. The power control method according to claim 6, further comprising:

a determining step of determining a kind of said control signal transmitted by processing in said transmitting step.

8. The power control method according to claim 6, wherein:

said given circuit performing processing corresponding to said individual information stored by processing in said storing control step.

9. The power control method according to claim 6, wherein:

in said extracting step, said transport stream packet whose destination is that on the receiving side is extracted from said transport stream.

10. The power control method according to claim 9, wherein:

in said extracting step, said transport stream packet whose destination is that on the receiving side is extracted from a packet ID (PID).

* * * * *